United States Patent
Hay et al.

(10) Patent No.: US 11,481,890 B1
(45) Date of Patent: *Oct. 25, 2022

(54) MONITORING OF OBJECTS BASED ON FREQUENCY SPECTRUM OF MOTION AND FREQUENCY FILTERING

(71) Applicant: RDI TECHNOLOGIES, INC., Knoxville, TN (US)

(72) Inventors: Jeffrey R. Hay, Prospect, KY (US); Mark William Slemp, Tellico Plains, TN (US); Kenneth Ralph Piety, Knoxville, TN (US)

(73) Assignee: RDI TECHNOLOGIES, INC., Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/592,835

(22) Filed: Feb. 4, 2022

Related U.S. Application Data

(63) Continuation of application No. 17/074,896, filed on Oct. 20, 2020, now Pat. No. 11,244,437, which is a continuation of application No. 16/009,749, filed on Jun. 15, 2018, now Pat. No. 10,853,930.

(60) Provisional application No. 62/678,442, filed on May 31, 2018.

(51) Int. Cl.
*G06T 7/00* (2017.01)

(52) U.S. Cl.
CPC .. *G06T 7/0004* (2013.01); *G06T 2207/20024* (2013.01); *G06T 2207/20104* (2013.01); *G06T 2207/30164* (2013.01)

(58) Field of Classification Search
None
See application file for complete search history.

(56) References Cited

U.S. PATENT DOCUMENTS

| | | | |
|---|---|---|---|
| 6,549,869 B1 * | 4/2003 | Piety | G01H 1/003 702/56 |
| 2010/0324423 A1 | 12/2010 | El-Aklouk et al. | |
| 2014/0072228 A1 | 3/2014 | Rubinstein et al. | |
| 2015/0134545 A1 | 5/2015 | Mann et al. | |
| 2016/0171303 A1 | 6/2016 | Moore et al. | |
| 2016/0171309 A1 | 6/2016 | Hay | |
| 2016/0171369 A1 | 6/2016 | Majumdar | |
| 2016/0210747 A1 | 7/2016 | Hay et al. | |

(Continued)

OTHER PUBLICATIONS

Jeff Hay; RDI Release Stabilization Update for the IRIS M with Motion Amplification; Mar. 6, 2017; RDI Technologies; USA; News; pp. 1-4; https://www.rditechnologies.com/rdi-releases-stabilization-update-iris-m-motion-amplification/.

(Continued)

*Primary Examiner* — Heather R Jones
(74) *Attorney, Agent, or Firm* — Wyatt, Tarrant & Combs, LLP; Stephen C. Hall

(57) ABSTRACT

Present embodiments include but are not limited to a video camera which is able to capture and record video data of an entire machine without contacting the machine, to visually study complex motions which vary both in time and spatially at different locations on the machine, wherein filters applied to the motion present in the video recording are used to identify frequencies of importance and to visualize their impact on the operation of the machine, including by removing certain frequencies of lesser interest from the video recording.

4 Claims, 13 Drawing Sheets

(56) References Cited

U.S. PATENT DOCUMENTS

| | | |
|---|---|---|
| 2016/0217587 A1 | 7/2016 | Hay |
| 2016/0217588 A1 | 7/2016 | Hay |
| 2016/0300341 A1 | 10/2016 | Hay et al. |
| 2017/0221216 A1 | 8/2017 | Chen et al. |
| 2018/0335366 A1* | 11/2018 | Qiao .................. G01M 13/045 |

OTHER PUBLICATIONS

Jeff Hay; Frequency Based Filtering is Here; Jun. 13, 2017; RDI Technologies; USA; News; pp. 1-4; https://www.rditechnologies.com/frequency-based-filtering.

Jeff Hay; Frequency Based Filtering forthe Iris M is here—Filter Update Release; Jun. 16, 2017; Email; RDI Technologies; USA; pp. 1-3.

Mazen, et al.; A vision-based approach for the direct measurement of displacements in vibrating systems; article from Smart Materials and Structures; 2003; 12; pp. 785-794; IOP Publishing LTD; UK.

\* cited by examiner

Legend
Solid: Included after filtering is applied
Dashed with dots: Excluded
Dashed: Active / Excluded

Fig. 2

Legend
Solid: Included after filtering is applied
Dashed with dots: Excluded
Dashed: Active / Excluded

Fig. 4

Legend
Solid: Included after filtering is applied
Dashed with dots: Excluded
Dashed: Active / Excluded

Legend
Solid: Included after filtering is applied
Dashed with dots: Excluded
Dashed: Active / Excluded

| Peak No. | Rank (1-10) | Frequency (Hz) | Amplitude (Mils P-P) | Orders xRPM | Filter Type | Filter Status |
|---|---|---|---|---|---|---|
| 1 | 1 | 29.2 | 1.418 | 1.000 | Bandstop ▼ | ✓ |
| 2 | 4 | 58.4 | 0.11 | 2.000 | Bandstop ▼ | ✓ |
| 3 | 9 | 60.01 | 0.074 | 2.055 | Bandstop ▼ | ✓ |
| 4 |  | 87.6 | 0.021 | 3.000 | Bandstop ▼ | ✓ |
| 5 |  | 89.22 | 0.006 | 3.055 | Bandstop ▼ | ✓ |
| 6 |  | 116.8 | 0.006 | 1.000 | Bandstop ▼ | ✓ |
| 7 | 5 | 120.03 | 0.106 | 1.151 | Bandstop ▼ | ✓ |
| 8 |  | 145.99 | 0.009 | 1.719 | Bandstop ▼ | ✓ |
| 9 | 7 | 209.25 | 0.082 | 1.965 | Bandstop ▼ | ✓ |
| 10 | 8 | 210.87 | 0.079 | 2.000 | Bandstop ▼ | ✓ |
| 11 | 2 | 240.07 | 0.659 | 3.017 | Bandpass ▼ | ✓ |
| 12 |  | 282.78 | 0.02 | 3.747 | Bandstop ▼ | ✓ |
| 13 | 3 | 269.27 | 0.371 | 3.816 | Bandpass ▼ | ✓ |
| 14 | 6 | 298.47 | 0.085 | 4.019 | Bandstop ▼ | ✓ |
| 15 | 0 | 300.09 | 0.051 | 4.888 | Bandstop ▼ | ✓ |

Filter Type Dropdown:
Bandpass
Bandstop
Lowpass
Highpass

Remove All Frequencies Between Peaks? ✓

Include Frequencies From All Listed Peaks? ☐

Fig. 10B

| Family No. | Frequency (Hz) | Orders xRPM | Amplitude (Mils P-P) | Family Score | Family Members No. | Family Members Member IDs | Filter Type | Filter Status |
|---|---|---|---|---|---|---|---|---|
| Hrm-1 | 29.3 | 1.000x | 1.423 | 100 | 10 | 1,2,3,4,5,6,7,8,9,10 | Bandpass ▼ | ✓ |
| Hrm-2 | 60.02 | 2.055x | 0.675 | 87 | 5 | 1,2,3,4,5 | Bandstop ▼ | ✓ |
| Sdb-1 | 30.82 | 1.055x | 0.157 | 85 | 7 | 2.00x - (Max)2.00x - 10.44x | Bandstop ▼ | ✓ |
| Sdb-2 | 29.2 | 1.000x | 0.113 | 72 | 6 | 3.11x - (Max) 4.11x - 10.11x | Bandstop ▼ | ✓ |
| | Remove All Frequencies Between Peaks? | | ✓ | | | | | |
| | Include Frequencies From All Listed Peaks? | | ☐ | | | | | |

Fig. 11B

MONITORING OF OBJECTS BASED ON FREQUENCY SPECTRUM OF MOTION AND FREQUENCY FILTERING

CROSS REFERENCE TO RELATED U.S. APPLICATION

This patent application claims the benefit of and priority to U.S. Nonprovisional patent application Ser. No. 17/074,896, filed Oct. 20, 2020, which was a continuation of U.S. Nonprovisional patent application Ser. No. 16/009,749, filed Jun. 15, 2018 (now U.S. Pat. No. 10,853,930, issued on Dec. 1, 2020), which claimed benefit of and priority to Provisional Patent Application Ser. No. 62/678,442, with a filing date of May 31, 2018, the contents of all of which are fully incorporated herein by reference.

FIELD OF INVENTION

Present embodiments relate to condition monitoring of machines and machine components by evaluating their motions identified from a frequency spectrum that can be filtered to remove motions occurring at frequencies that are not likely associated with a problem condition, thereby emphasizing and enabling amplification of ones more likely to be associated with a problem. The ability to produce filtered video recordings of the motion in order to visualize the motion associated with faults or undesirable operational states is a powerful diagnostic tool which provides convincing documentation of the anomalous behavior to even non-technical persons.

BACKGROUND

Many industrial processes involve machines with moving components or workpieces that may vibrate in characteristic patterns. Examples include a moving paper web such as used in printing operations; moving sheet metal in rolling, heat treating, and finishing operations; and conveyor systems, including rolling components such as individual rollers that support an elevated conveyor. It will be appreciated that in each of these situations, important dynamic information may be found and extracted for use in predictive maintenance and diagnosis of existing or arising problems.

This is because a number of different kinds of faults in machinery can be identified or dismissed by characterizing the motion of the machines (vibration patterns). For illustration only and not limitation, some of these typical problems include machine imbalance, misalignment, looseness of components, and resonance conditions to name some. Consequently, early and accurate detection of faults occurring in machinery is important for scheduling maintenance and extending the life of machines.

Some technicians gather information related to machine faults from the shape of vibration waveforms (i.e., a "time waveform") as well as from specific frequencies that may be present in a vibration spectrum. Ultrasound, accelerometers, and velocimeters are some of the sensors used to measure vibration. However, these often are placed in direct contact with machine components so they do not offer the flexibility of non-contact evaluation, such as by a video showing movement of machine components. Further, various existing sensors such as ultrasound, accelerometers, and velocimeters are limited to making measurements at a single location on the machine where as a video recording of the dynamic changes in a structure provides measurements at thousands of locations simultaneously which enables an analyst to view motions at any location within the field of view of the recording as well as to determine phase relationships between the motion seen on different components.

Consequently, isolating and visualizing particular movements that actually have diagnostic importance from a plethora of vibration frequencies happening among multiple moving components is a primary unfulfilled need in this field. In short, there is a need for more efficient, reliable, and accurate methods for filtering based on movements that are not of interest or little interest, such as the normal and recurrent motions of a machine, in order to isolate movements occurring at frequencies that are more likely to be associated with a particular problem.

Further, a prior approach of obtaining a time waveform or vibration spectrum from a sensor attached to some location on the machine may result in obtaining data from a location which does not present information related to the anomalous behavior being investigated and may require data to be required from many different locations to capture data from the root cause problem. Thus, this troubleshooting approach has a number of drawbacks and may greatly increase the time required to reach accurate diagnostic conclusions.

In some respects, the use of graphs and numerical data from vibration waveforms and spectra has been a worthwhile tool for the machinery analyst who is skilled in the use of such techniques. However, a prior approach such as this is quite limited in comparison to the visual presentation of machine motions, which optionally can be amplified, rendered at a rate of perception optimized to the human eye, and filtered to enhance the destructive modes of interest. In short, there is a need that is met by the embodiments described herein for a very intuitive presentation of machine behavior that can be grasped by persons with limited training, while presenting supporting data for authorizing the needed corrective actions to remedy machine problems.

A drawback of existing tools and practices applied to video recordings involves a limited ability to filter out various frequencies different from the frequency (or frequencies) of interest. This is very challenging to do from a time waveform of vibration patterns and often amounts to guesswork. Likewise, it is often the case that areas on the vibration spectrum between frequency peaks are not of interest because they amount to noise, or because there are no vibrations of significance occurring at these frequencies. If these no interest or low interest frequency ranges could be filtered out (i.e., removed from the graphical or visual depiction of vibration amplitude), it would have the effect of isolating motion at a frequency of interest and making it clearer to visualize the isolated motion, because motion associated with background vibration is removed and/or noise is removed from the image making motions clearer. In this way, motion related to a root problem can best be identified visually and understood when other frequencies are removed that mask the phenomenon of interest. However, while it is known to apply lowpass, highpass, bandstop, and bandpass filters to filter out these frequencies of lesser interest and provide a visualization of motion at a particular frequency, any of these approaches requires a significant amount of trial and error, guesswork, failure, inefficiency, and, ultimately, user interaction. The inventors are unaware of prior tools or techniques that either determine, or assist a user in selecting, which frequency filters to apply in obtaining the most relevant data concerning motions.

Accordingly, there is still yet additional need for accurate diagnosis of machinery problems by interrogating vibration patterns, particularly as it relates to being able to focus on frequencies of interest and to remove other frequencies along a vibration spectrum. By eliminating noise or other unwanted frequencies, it becomes possible to more easily and more accurately determine the condition of a machine or machine component that is being analyzed, and the current embodiments are addressed to this improvement.

SUMMARY

Current embodiments described herein pertain to apparatuses and methods for analyzing periodic movements in machinery. More particularly, the embodiments pertain to non-contacting systems and methods for analyzing vibrations and other periodic movements in machinery (generally referred to herein as vibrations for brevity and ease of reference, but not in a manner to be construed as limited to vibration). Further disclosed herein is novel data processing for assessment of machine motions as indicative of condition and predictive maintenance. Further still, embodiments include a smart user interface that depicts which peaks (based on amplitude of motion from video versus the frequency at which the amplitude occurs) are available for selection at a particular frequency or frequency range (i.e., frequency value), which in effect is done by filtering out all motion occurring at peaks aside from one or more selected peaks. By these selections, the present embodiments produce video or sets of videos based on the selected and applied filters, in which autonomic, manual, and pre-set filters are among the options.

As used herein, the terms "machine", "machinery", and "mechanical component" are intended to be taken in their broadest sense, to include any mechanical component of a larger machine that may exhibit some periodic movements. It includes, for example, motors of all kinds (electrical, internal combustion, turbines), components and linkages connected to or driven by motors; machine tools, grinding wheels and tool bits; electrical and hydraulic actuators; pumps, blowers, fans, pipes, ducts, and other fluid- or air-handling equipment; aircraft components (wings, airfoils, control surfaces of all kinds, landing gear, struts); trackways, conveyors and materials or components conveyed thereon; and any parts, products, and workpieces that are moving through a production environment. Examples of the latter include paper moving through a papermaking machine or reduction line; paper or plastic sheet moving through a printing process; sheet metal being rolled, coated, treated, galvanized, hot-dipped, or otherwise handled in a continuous or semi-continuous form; wire or polymer fibers being drawn or extruded; and woven and nonwoven fabric being produced, dyed, printed on, or cut. It may also include components that are not directly driven or intended to move, but which are subject to incidental vibrational inputs, such as components in a motor vehicle that are incidentally vibrated by the engine or by movement on a rod.

As used herein, the term "vibration" refers to any physical movement that may be characterized by some periodic change of position as a function of time. Vibrations may be periodic, such as, e.g., sinusoidal, symmetric sawtooth, asymmetric sawtooth, or they may be aperiodic or noisy. Vibrations may have any waveform, which may include waveforms characteristic of superimposed vibrations of different frequencies, amplitudes, and phases.

The monitoring of objects described herein comprises at least an imaging device that acquires a series of video frames depicting motion and stored as a video file, in which each video frame comprises a plurality of pixels. Video cameras, optical sensors, infra-red (IR) sensors, smart phones, and webcams are examples of imaging devices. In some embodiments, the image captured by the imaging device may represent a pattern that can be displayed as pixels of reflected and/or emitted visible light, UV, IR, X-rays, gamma rays, or other electromagnetic radiation detected by a two-dimensional position-sensitive detector.

The descriptions herein further comprise a data analysis system including at least a memory and a processor executing software. In some embodiments, when a user indicates a region of interest in a video frame or series of video frames, such as by drawing a box around a region in the frame, all frequencies of motion as determined by amplitude are extracted from the video. As needed, the location of the region of interest signified by the box can be redrawn and repositioned as selected by a user. In this way, in some embodiments the filtering itself is accomplished based on frequency content in the video which leads to a more informed decision (whether manual by the user or automatic by the system) on how filters should be applied to remove certain frequencies of lesser interest from the video. Alternatively, motion is sensed and frequencies obtained from an outside source, again such as accelerometers, velocimeters, and laser vibrometers.

Based on all the motions and frequencies captured in the region of interest, a frequency spectrum is obtained. This spectrum identifies the frequencies present in a region of interest located in the video data, which is displayed to enable data filtering to show the motions of machinery or machine components only at selected frequencies in the video. Motions associated with non-selected frequencies are frozen as static images. In some embodiments, the frequency spectrum generated by the system or in accordance with the method is color coded to show what frequencies are to be filtered out and which frequencies will remain in motion in the modified video. This makes it possible to identify frequencies of interest from a frequency spectrum based on peak information. In turn, identifying frequencies of interest makes it more efficient to evaluate their effect on the machine or component, and the current embodiments are efficient for applying the filters in a consistent way without resorting to guesswork.

In some embodiments, a user interface provides an output signal conducive to identifying frequencies of interest. This signal is manifested both as a frequency spectrum and as a dynamic video modified based on user selections from such a frequency spectrum or pre-applied automatic filter settings. In some embodiments, a user interface is graphical and connected to a database storing previously-recorded frequency data associated with motions, including without limitation previously used filters and the results when those filters were applied.

In some embodiments, available filters are listed in a table or dropdown menu and are text editable. Changing those fields, such as by designating a new range of frequencies to be shown in the dynamic video, updates the graphical display of the filters in the spectrum. Conversely, editing the graphical spectrum, such as by movement of a slider along the X-axis of the spectrum, updates the text or table of filters. Accordingly, in some embodiments, a graphical spectrum is interactive, in that when a user clicks on a graph and moves the filters on the spectrum, the end points on the filter move to a new frequency and the frequency range of the filter is changed. A non-limiting example is a user clicking on the spectrum and moving the end points on the filter to a new frequency. Additionally, in some embodiments, the system processor through the execution of computer-readable program instructions (i.e., software) determines one or more peaks of interest and automatically pre-populates the graphical user interface with filters based on those peaks. For visualizing the motion, the system in some embodiments is programmed to display a video that has dynamic filters applied, and shows which of the current filters is being applied with respect to the displayed video. The display in some embodiments includes a plot of the movement along a timeline that pinpoints each frequency filtered along that timeline. Optional features in this regard may include a cursor for a user to move interactively on the spectrum to show which frequency filter is being applied at any given time along the graph.

Further still, in some embodiments the system changes the filters temporally through the video. For example, with a video that is 1000 frames long, the software may apply a 30 Hz bandpass filter to the first 100 frames, and 40 Hz filter on frames 101 to 200, and so on. This may be overlapped so that the 30 Hz filter is applied to frames 1-100, the 40 Hz applied to frames 5-105 etc. In a variable speed machine, these changing filters may be based on the current running speed of the machine, so that the running speed is constantly determined and the filter changes dynamically throughout the video. In some embodiments, the dynamically-changing filters are based on frequencies and amplitudes extracted from the video. For example, each video frame is divided into individual pixels having x, y coordinates. Amplitude is extracted by measuring the distance from a trough to a peak along a given coordinate(s) within a movement cycle. With each pixel representing a certain length along their dimensions, knowing how many pixels are represented from trough to peak enables a calculation of amplitude. In some embodiments, the software executed by the processor scans the field of view obtained in the region of interest from the recording, and automatically selects x, y starting and ending locations with the most motion present, thus using motion/amplitude frequency content at these locations to construct a set of filters to be applied.

In some embodiments, filters applied to a video file may be recorded in the file itself, allowing later access and use of the same filters during later video acquisition of the same machine or component. Optionally, previously used filters in a video are shown on a user interface screen so they can be applied later and reused. Some embodiments include those wherein frequency filtering leads to visualization of each frequency individually or as a grouping to produce separate data sets which are converted to video that isolates movements at the frequencies of interest. In this regard, the system is configured in some embodiments for a user to select a previously filtered data set and automatically filter other videos—perhaps of the same machine operating on a different date—based on the previously applied filters, for example by selecting all or a subset of filters from a previously filtered recording.

Moreover, in some embodiments, the system is configured to automatically apply a filter, for example a bandpass filter, around a peak based on clicking on that peak, and to automatically determine the width of the peak to filter. In some embodiments, user options in this regard include the ability to select one or more peaks where the width of the filter (e.g., in Hz) is automatically set for all peaks. In some use cases, certain areas along a frequency spectrum that are located between frequency peaks are filtered out as not likely of interest because there would be no vibration of significance occurring at these frequencies. Additional options within the scope of embodiments include user-selected thresholds above which all peaks are filtered out. The user chooses peaks and the software filters each peak separately or in combinations to produce new data sets from which videos of the movement are created, and these are modified to isolate movement at frequencies of interest by freezing movement at the other frequencies (i.e., rendering static and motionless what otherwise was in motion in the original recorded video). In some embodiments, particular bands are selected automatically, or identified by a user manually, to produce multiple filtered data sets. Thus, embodiments include those in which a user manually selects or the system processor designates automatically the type of single or multiple filters to be employed, including without limitation lowpass, highpass, bandstop, and bandpass filters.

Generally, systems and methods according to present embodiments filter out (remove) motions at lesser interest frequencies to isolate movement occurring at one specific frequency of interest or within a narrow range of frequencies. In some embodiments, isolated motion is then amplified through additional processing. With or without the optional amplification of motion, a component's change in position through the cycle of movement is even more pronounced visually because random, often lower-amplitude vibrations are removed from the video.

BRIEF DESCRIPTION OF DRAWINGS

The drawings, schematics, figures, and descriptions contained in this application are to be understood as illustrative of steps, structures, features and aspects of the present embodiments. Accordingly, the scope of embodiments is not limited to features, dimensions, scales, and arrangements shown in the figures.

Figure 2:
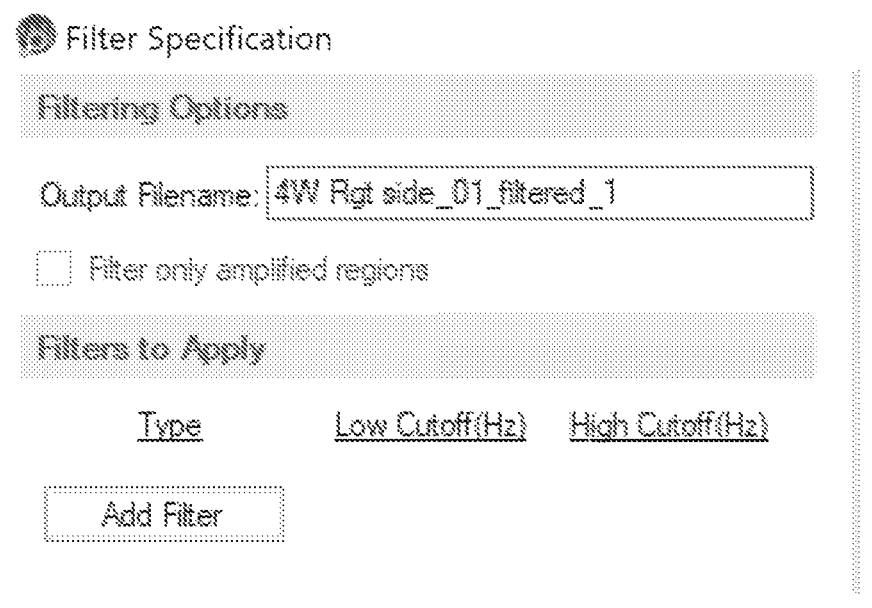

FIGS. 2, 4, 6 and 9 are reproductions of a user interface screen, according to multiple embodiments and alternatives, each of which depicts a different filtering specification and options for filtering machinery such as that shown in FIGS. 1A, 3A, 5A, and 8A.

FIG. 7 is a reproduction of a user interface screen, offering filtering selections to be automatically applied by the system based on previously used filter applications, according to multiple embodiments and alternatives.

FIG. 10B is a table showing filtering options and filtering selections consistent with the graph produced in FIG. 10A, according to multiple embodiments and alternatives.

FIG. 11B is a table showing filtering options and filtering selections consistent with the graph produced in FIG. 11A, according to multiple embodiments and alternatives.

MULTIPLE EMBODIMENTS AND ALTERNATIVES

Figure 1A:
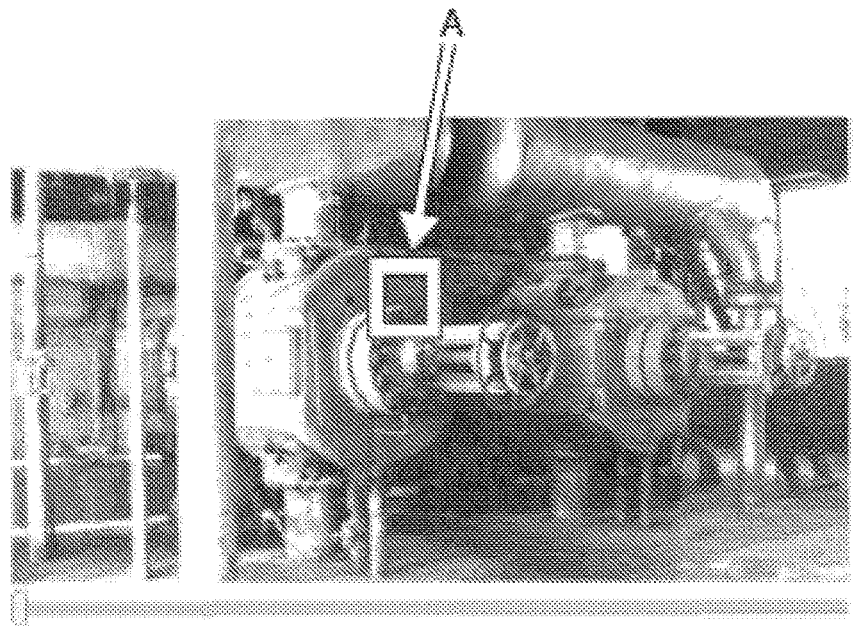
FIGS. 1A, 3A, 5A, and 8A are photographs with a region of interest denoted by box "A" indicating a selected frame from the video recording of the machinery. For motions occurring within the region of interest, the software creates a waveform and a frequency spectrum, as shown in FIGS. 1B, 3B, 5B, and 8B for motions occurring within the region of interest, according to multiple embodiments and alternatives. The legend for all frequency spectra shown in these figures is as follows: a solid line denotes a frequency of motion included in the data after filtering is applied, such that motion occurring at such a frequency is shown in a modified video or otherwise available for data extraction; a dashed line with dots denotes motion that is excluded from the scene after filtering is applied, e.g., noise; and a dashed line (no dots) denotes motion that is excluded under a filtering scheme currently in use, but which a user can change flexibly and interactively so motion occurring at frequencies denoted this way can be easily interrogated.
Figure 1B:
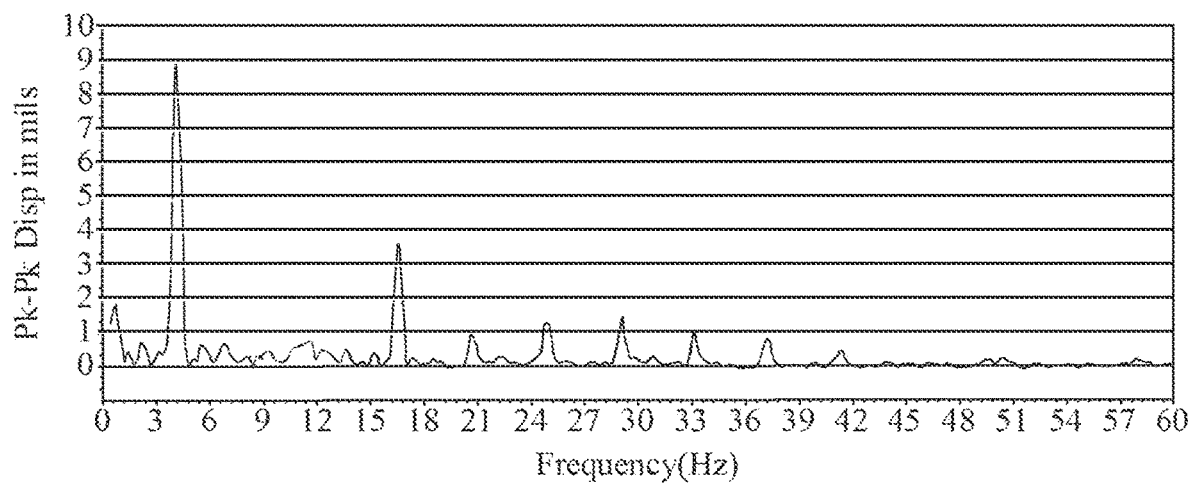

Embodiments of the present disclosure include apparatuses and methods for filtering content associated with motion of machinery whose components and parts move at different frequencies. Video of the motion is acquired, optionally within a region of interest as denoted by a user such as by drawing a region box as denoted by region A on FIGS. 1A, 3A, 5A, and 8A. This enables a user to select a region that has frequencies of interest that are particular to one portion of the machine. Advantages of present embodiments include selectivity that aids in diagnosis of problems from acquired knowledge of what frequencies are contained in a particular video. Frequencies of motion of individual parts are extracted from video and shown in a time waveform or a frequency spectrum. In this way, one or more filters can be applied to a specific region(s) of an image rather than having the entire frame processed. In the latter scenario, a workaround, albeit an inefficient one, is to train the video camera on a single component and take video only of that, but again the same level of guesswork would have to be involved in picking the right component, especially when dozens or more components may be actively moving in a single shot.

In some embodiments, monitoring machinery in accordance with systems and methods described herein comprises: positioning a video acquisition device at a selected distance from a machine component and having an unobstructed view of a selected portion of the component such as depicted in FIGS. 1A, 3A, 5A, and 8A; providing a data analysis system including a processor and memory to analyze the acquired video file and extract a frequency spectrum as shown in FIGS. 1B, 3B, 5B, and 8B. In some embodiments, the acquired data first resides in raw video form. From this data, time wave forms are extracted out of the video. From the time wave forms, a frequency spectrum is determined that is the basis for setting the filters. By way of non-limiting example, filters applied to create the graph shown in FIG. 5B would select, i.e., include in the post-filtering data including new video output produced in accordance with some embodiments, motion that is associated with the peaks at about 18 Hz, 33 Hz, and 37 Hz (see solid line). Still with reference to FIG. 5B, and in further view of FIG. 6, by this selection the data subject to the bandstop filter between 18.24-30 Hz is filtered out, resulting in two noncontiguous peaks (18 Hz, 33 Hz) present in the new video output.

In some embodiments, a time waveform is generated from which frequencies are extracted. The waveform of the motion measures an amplitude of displacement versus time. When converted to a frequency spectrum, the peaks in the spectrum identify periodic motions occurring at that frequency. While random impacts or jerks can be identified in the waveform data, such non-repetitive events could be studied visually in the unfiltered video. These non-repetitive occurrences such as impacts smear energy across many frequencies in a spectrum and will appear as background noise in a spectrum rather peaks. Investigating these events visually in the video would be enhanced by removing the frequency content associated with all peaks in the spectrum. Removing all of the frequency content between peaks would remove or diminish the presence of these non-repetitive events and enhance the visualization of periodic motions in the video. Faults may occur at low or high frequencies, but typically are associated with peaks. And it is in this way, that particular faults in various mechanical components generate different characteristic frequency patterns which enables an analyst to identify the source of incipient failures.

Because each frequency of motion of video content in a region of interest is reduced to a frequency spectrum, it facilitates user selection (manually) or system selection (automatically) of motion frequencies to isolate by filtering out motions at other frequencies. The ability to derive frequency content, including from a video that includes a region of interest containing moving parts of a machine, and provide a frequency spectrum offers several advantages because the selected filters can be tailored to real-time information coming from the video of the machine, rather than having to identify what frequencies will be interrogated before any visualization of the machine is obtained.

In some embodiments, a video imaging device captures and provides input of video data of a machine during operation. Embodiments further comprise memory, and a processor operatively connected to memory and executing computer readable instructions to apply filters automatically or implement user-selected filters in accordance with the descriptions provided herein. In this regard, memory is to be broadly construed to include all forms of computer readable storage media, such as but not limited to read-only memory (ROM), random access memory (RAM), non-volatile RAM (NVRAM), optical media, magnetic media, semiconductor memory devices, flash memory devices, mass data storage device (e.g., a hard drive, CD-ROM and/or DVD units) and/or other storage as is known in the art. In some embodiments, a user interface is connected to video input and graphical display of a frequency spectrum to both facilitate manual selection of frequencies to filter and to denote previously used filtering options. Optionally, additional sensors may be applied to the machine to acquire vibration data or measure the turning speed of a machine being driven by a variable speed motor. If an existing or potential problem in a machine is more likely to be proportional to operational speed, such an external sensor allows real-time detection of operating speed and application of tracking filters which are synchronized to running speed and/or one of its multiples enabling the visualization of this motion in the video. This allows the video to be filtered to further isolate and study motion related to a frequency which may be varying in time such as occurs during a startup or the coast down of a machine. In this embodiment of the invention, the selected filters would not be derived from a frequency spectrum of the motion calculated from a region of interest but would be driven directly from an external signal with a frequency directly proportional to the running speed of the machine such as might be generated from once-per-revolution tachometer pulse. Another example would be a motion of a component in a region of interest such as region A in FIG. 1 that might occur on a machine with multiple operating states in which a video taken is 1000 frames long, the ramp-up phase is occupied in the first 100 frames with a particular movement of interest occurring at 30 Hz, followed by a series of frames at full operating speed in which that particular movement of interest would be occurring at 40 Hz. A temporal shift occurs in this scenario in which, for example, a 30 Hz bandpass filter applied to the first 100 frames is followed by a 40 Hz filter on frames 101 until the frame is reached that is associated with ramp down.

Accordingly, many embodiments described herein produce a frequency spectrum from which all the frequencies within a region of interest are optionally interrogated. Generating a frequency spectrum identifies with certainty the existence of movement data to be captured and reviewed at a particular frequency. The relevance is that most industrial machines are a collection of many parts, any one or more of which can be associated with an existing or potential fault, and a given part may be moving at a different frequency than a neighboring part. Consequently, merely generating a time waveform is confusing because there is only a composite picture of multiple parts in a region of interest, rather than having it broken down into the particular components whose motion varies as listed on a frequency spectrum. The frequency spectrum in accordance with present embodiments informs about the peaks based on different amplitudes, in effect breaking down the time domain into specific frequencies which are more useful in selectively deciding where to interrogate than a time waveform.

In some embodiments, criteria are implemented in view of frequency spectra contained in a recorded video as saved in system memory, thereby allowing the system to filter and produce a modified video based on frequencies of interest. In some respects, the implementation of filtering criteria is automatic. In an exemplary use, peaks above a certain signal-to-noise threshold are selected automatically and other peaks below this threshold are automatically filtered out so that motion occurring at those frequencies is frozen and not depicted in the new video generated by the system. Another example of how filtering schemes applied to frequency spectra are selectively applied in a more efficient and effective manner involves a user obtaining videos of a region of interest from a machine for 10 days. The user then selects the application of filters to retain the top one, two, three or "n" frequencies based on amplitude in the videos from each day, allowing comparison to be made to highlight changes in amplitude over time. When isolated in this manner, the changes in amplitude are shown visually on the video that isolates only those auto-selected frequencies and freezes motions at other frequencies. Embodiments include those wherein the motion can be slowed down or speeded up based on movement of a slider bar by the user. Further, the playback feature in some embodiments is configured to playback the filtered video frame by frame or in an amplified manner as further described below. Moreover, to further promote efficiency, in some embodiments the system software is configured to read a unique identifier such as a barcode or QRC code on a machine to more effectively store and search for filter data based on that individual machine. Additional embodiments include mounting a target on a machine component which can be identified automatically in the video frames and using this as the area of interest to be evaluated for the purpose of selecting filters that will be applied to the video recording.

While the above provides some non-limiting examples of automatic setting of filters, in some embodiments, a user manually selects frequency ranges to have depicted in video form by filtering out unwanted frequencies, for example by placing a cursor operationally connected to a mouse or slider bar on either side of a frequency peak or peaks at an amplitude of motion the user wants to have isolated. Accordingly, the inventive systems and methods offer a more direct way to visualize motion of the machine based on more efficient identification of frequencies of interest. The flexibility to identify frequencies of interest from a single spectrum rather than a near-infinite number of possible time waveforms allows a user to select from motions that are known to be specific to a particular machine at a particular time.

Turning to the figures, in some embodiments a graphical interface may provide color-coded graphs in which a first color represents frequency peaks of interest, which in some cases are ones with significant and greater amplitude. For example, in some embodiments, what is shown in FIGS. 1B, 3B, 5B and 8B as a solid line will appear through the user interface as a first color at approximately 9 Hz and again at approximately 29 Hz in FIG. 8B. A second color (represented in the graphs as a dashed line with dots) may then represent frequencies having no content of interest such as the undulations beginning around 42 Hz in FIG. 5. A third color (represented in the graphs as a dashed line, no dots) is depicted in several of the graphical figures in which motion is excluded under a filtering scheme as currently in use, but which a user can change flexibly and interactively to show motion at these frequencies to have them interrogated and replayed in the video. In some embodiments, icons are provided for navigational and searching capabilities in the user interface. For example, left and right arrows may be visible on the screen and responsive to user input to allow movement to an earlier frame (left arrow) or a later frame (right arrow) in a series, while the up/down arrows would allow a user to scroll up or down within a particular frame. Other icons may be employed to signify the ability to zoom in or zoom out in the video frame, for example to more clearly visualize some aspect of the machinery within the region of interest.

Figure 3A:
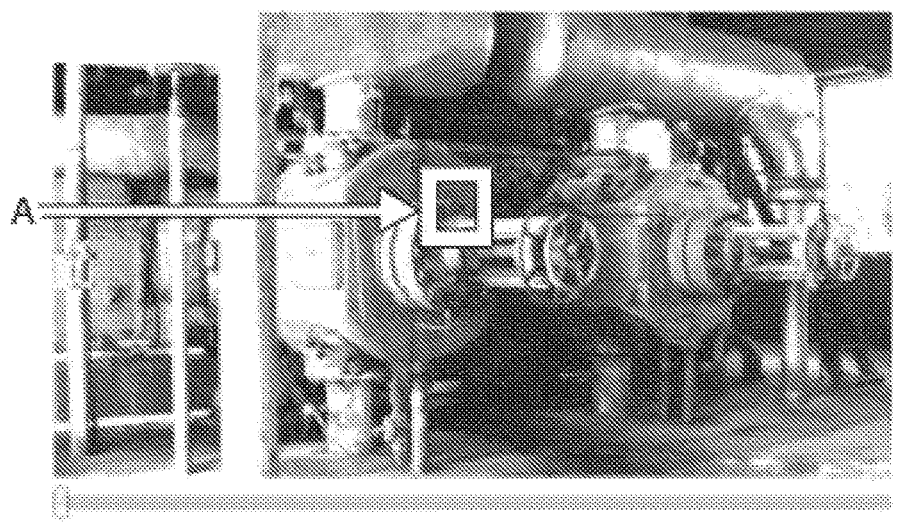
Figure 3B:
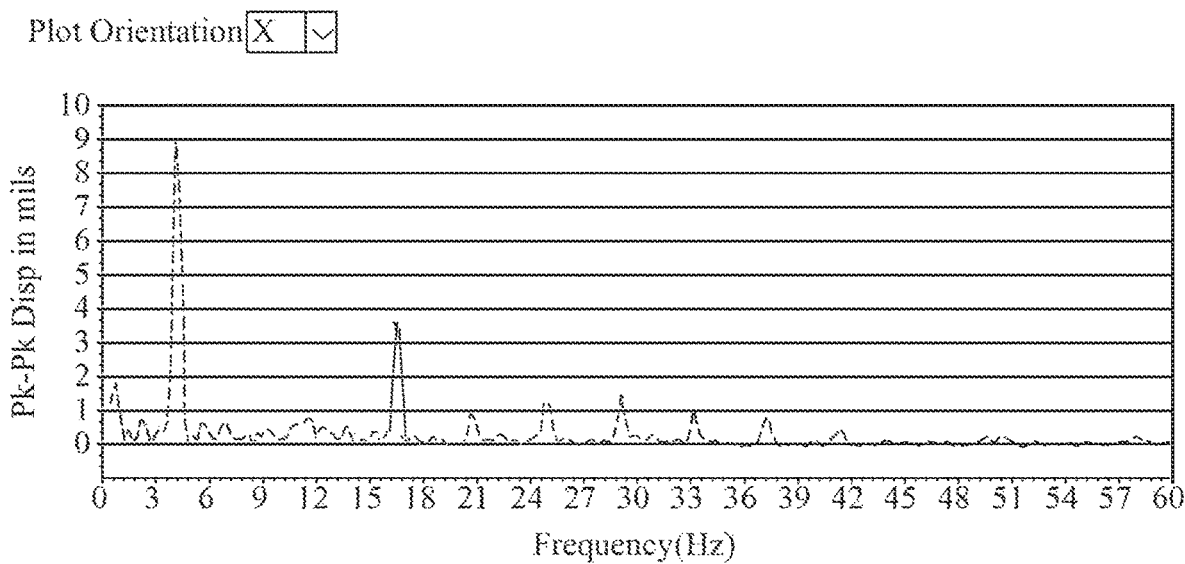
Figure 4:
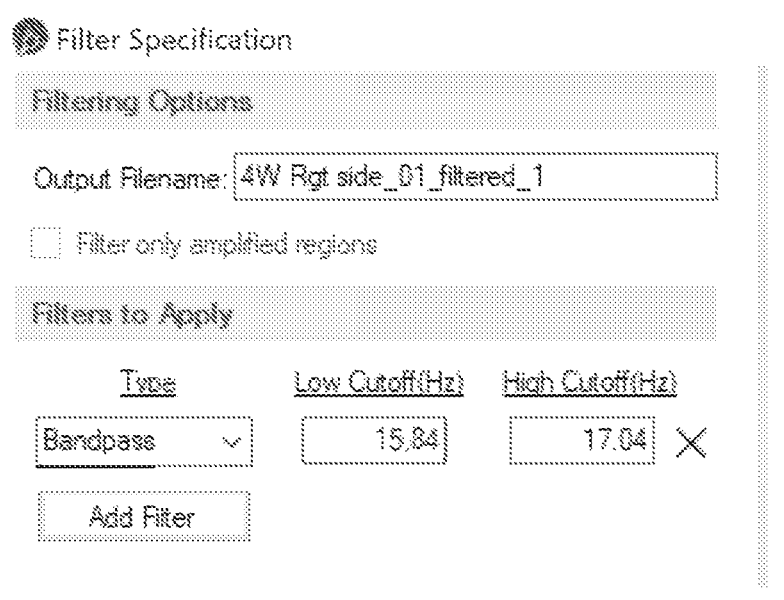
Figure 5A:
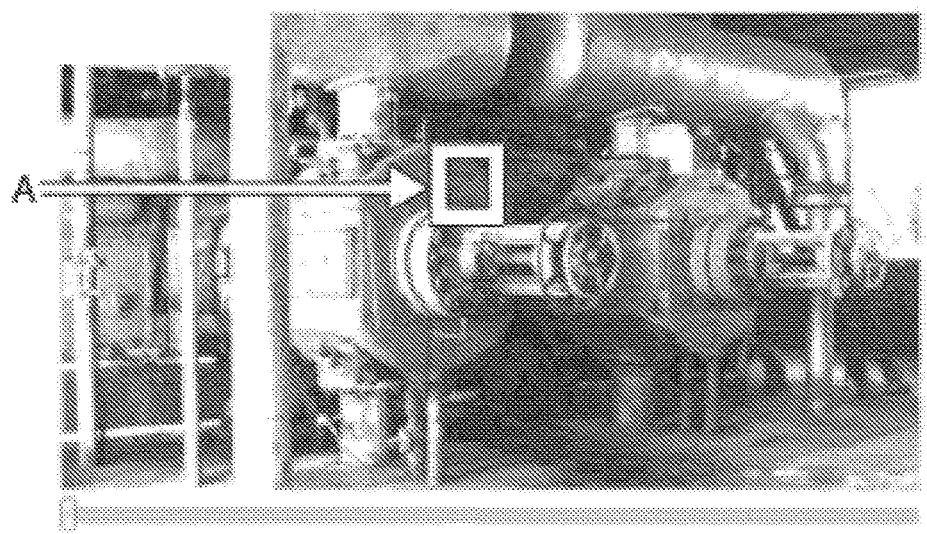
Figure 5B:
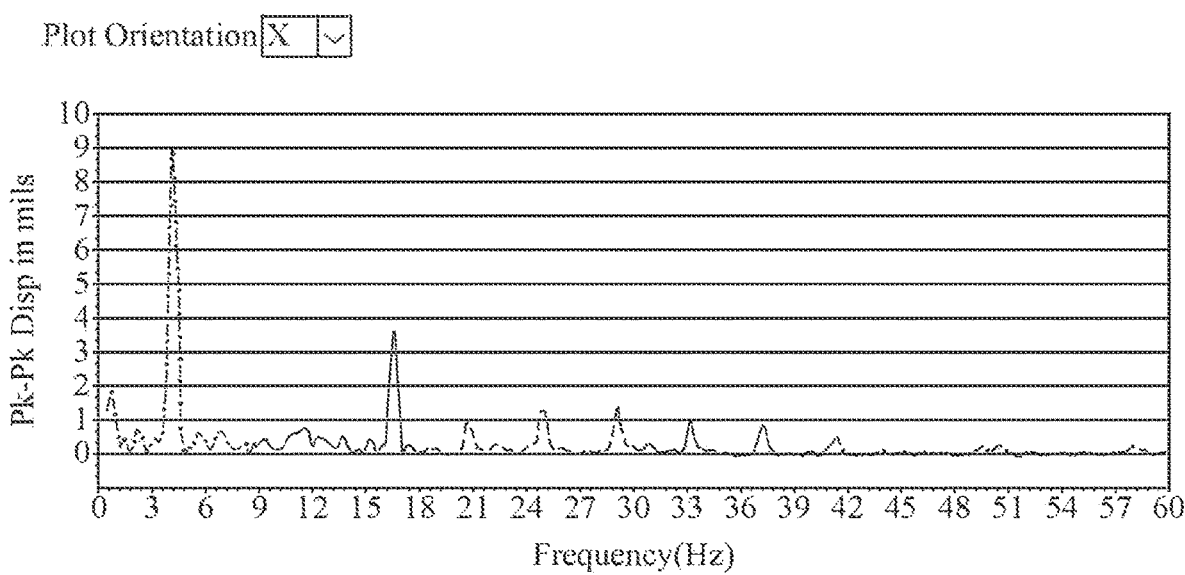
Figure 6:
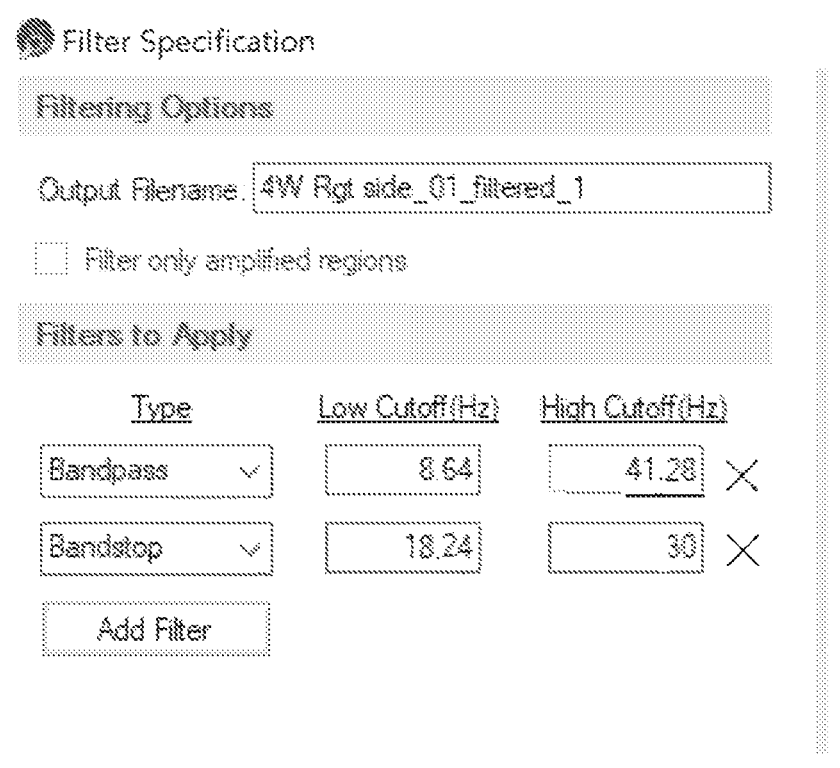
Figure 7:
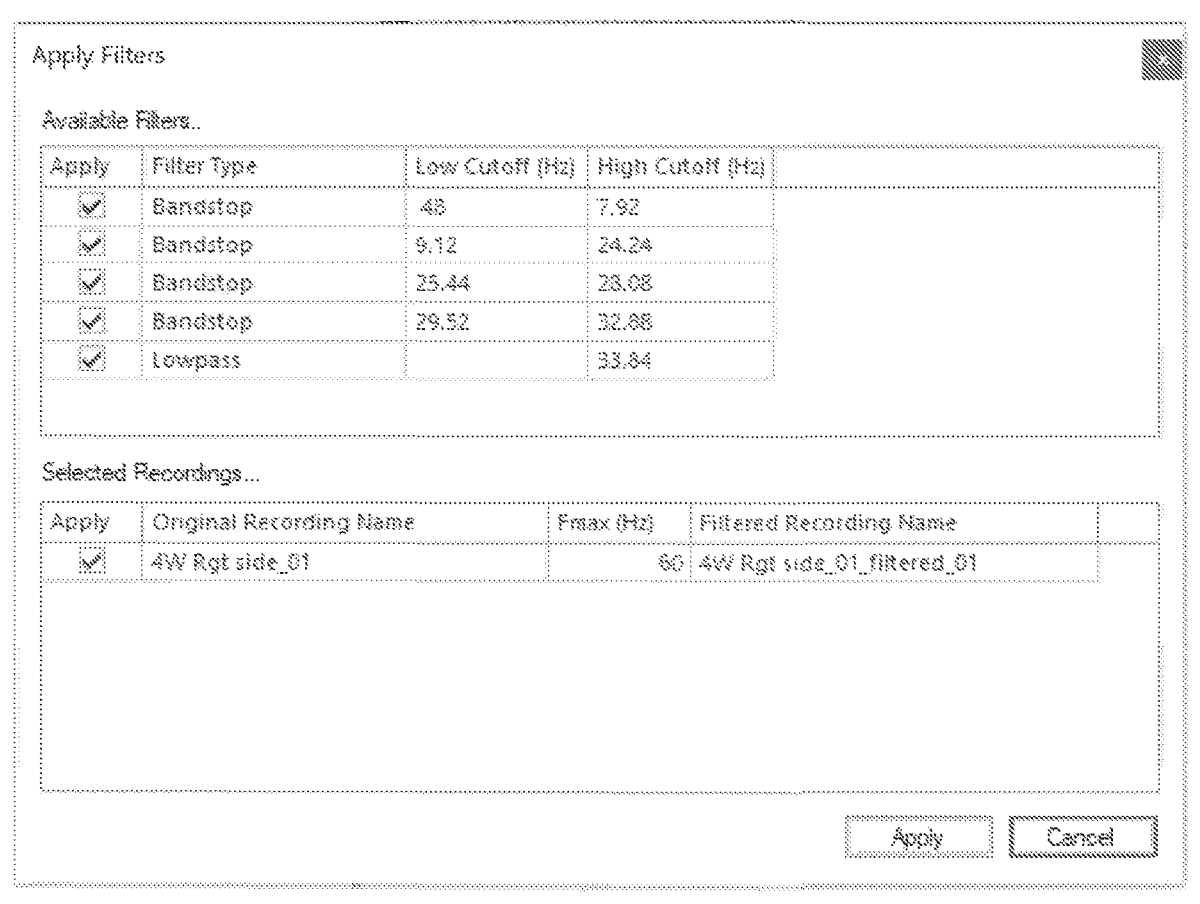
Figure 8A:
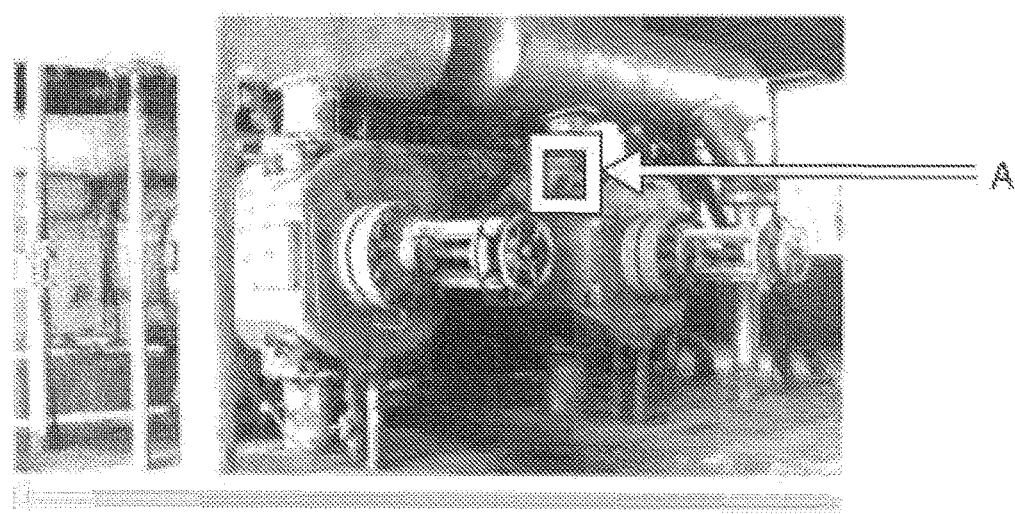
Figure 8B:
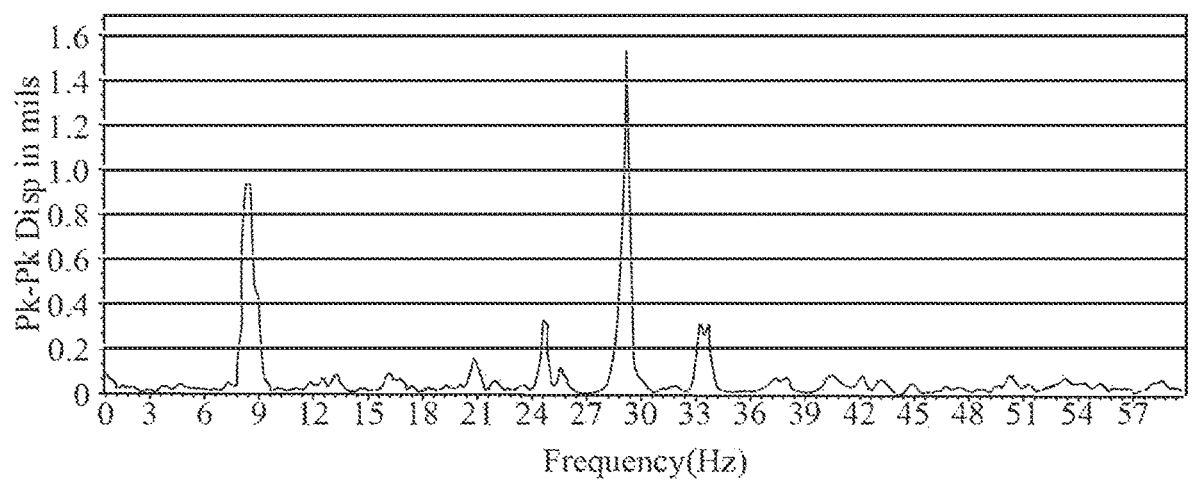
Figure 9:
Figure 10A:
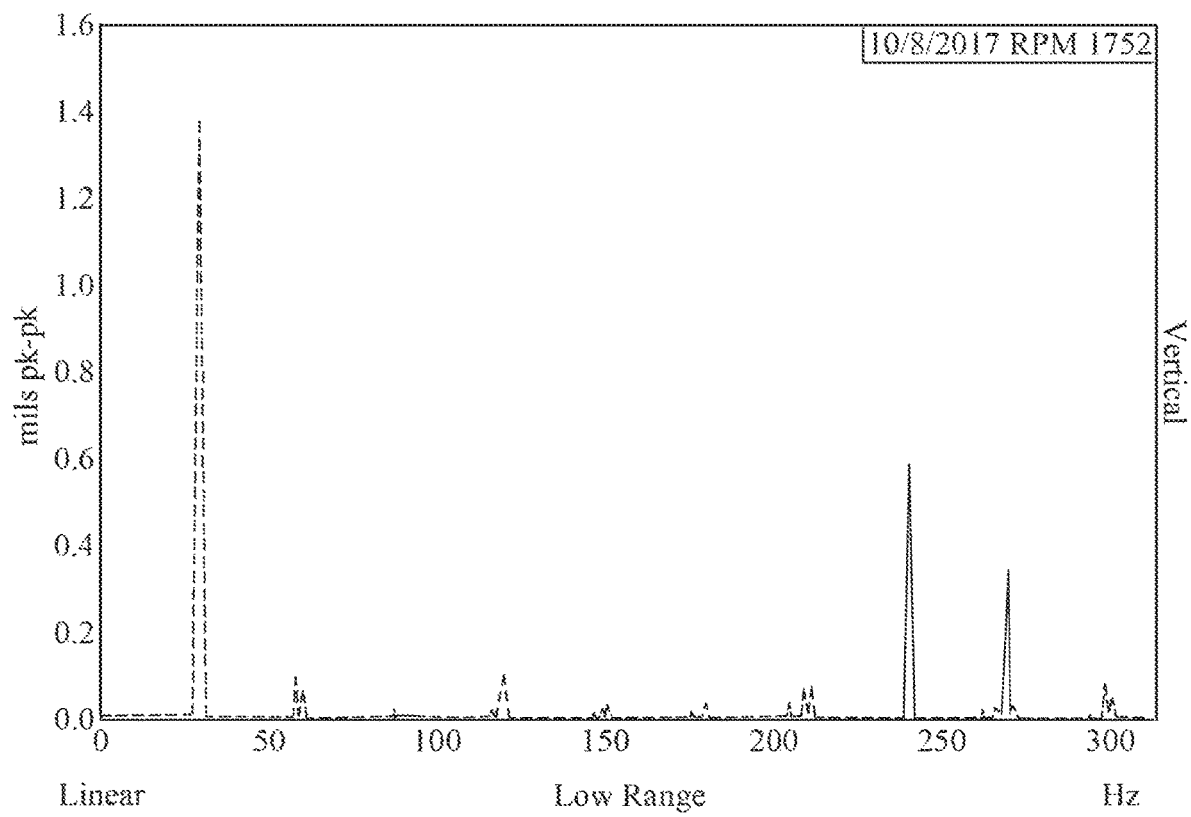
FIG. 10A is a graph depicting filtering for a frequency spectrum, according to multiple embodiments and alternatives.
Figure 11A:
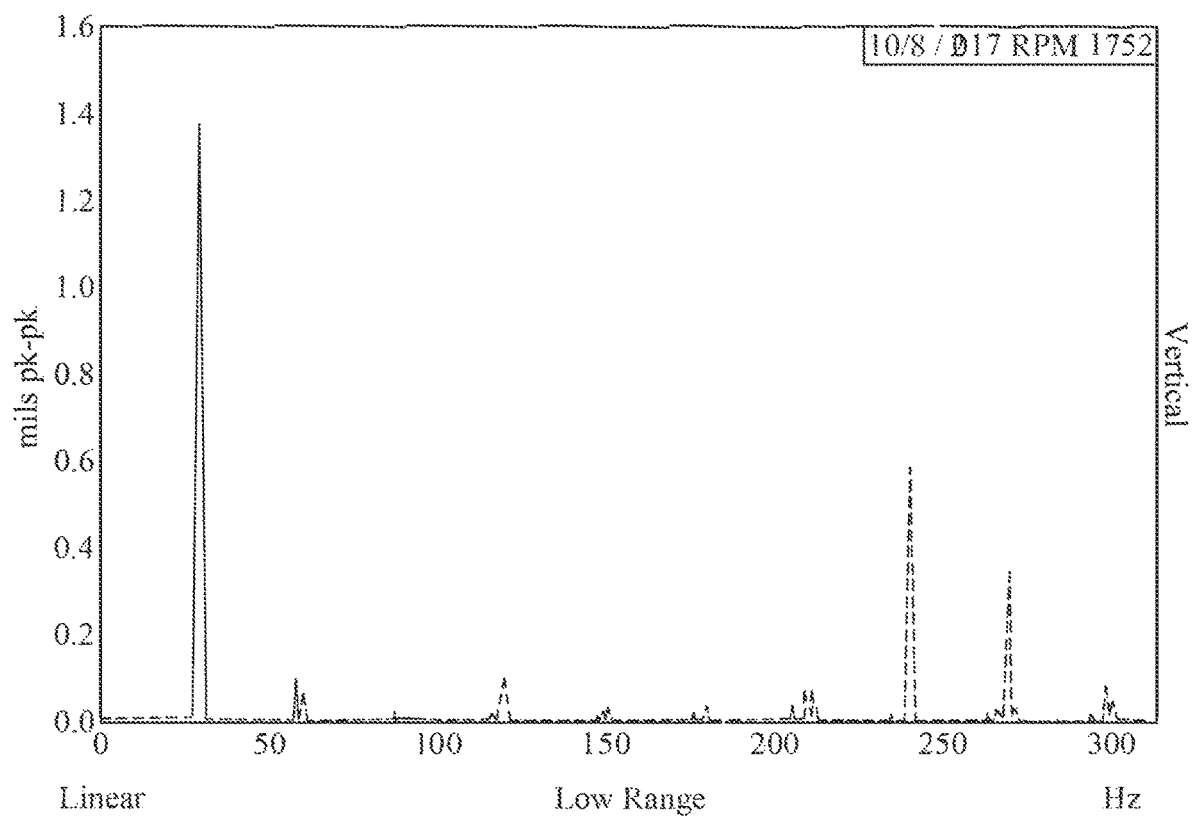
FIG. 11A is a graph depicting different filtering applied for the frequency spectrum as shown in FIG. 10A, according to multiple embodiments and alternatives. The legend for all frequency spectra shown in these figures also is a solid line to denote a frequency of motion included in the data after filtering has been applied; a dashed line with dots to denote motion that is excluded from the scene after filtering is applied, e.g., noise; and a dashed line to denote motion that has been excluded under a filtering scheme currently in use.

Further still, as shown in FIGS. 2, 4, 6 and 9, in some embodiments, a table is used that shows available filters or previously-used filters. FIGS. 7, 10B, and 11B illustrate additional embodiments whereby a user has the ability to select one or more peaks and click which filters to apply. With regard to FIGS. 10A, 10B, 11A, and 11B, in some embodiments a waveform of motion in a collection of components and frequency spectrum of that waveform is automatically generated based on the pixels best identifying the motion in the selected area of interest (box, indicated by arrow, as seen in FIGS. 1A, 3A, and 5A) drawn on the image taken from one frame of the video recording. FIGS. 10B and 11B, which show a list of the largest peaks in the spectrum and a list of the peak families, further identify a set of peaks which are related harmonically or as sideband peaks around a center peak, to assist a user in identifying areas on a frequency spectrum of greatest opportunity when trying to decide what filters should be applied.

Beyond providing an interactive frequency spectrum which can be manipulated graphically to setup the filters, a peak list and peak families facilitate the identification of the largest peaks in the spectrum and whether they are related to each other. "Hrm" is an abbreviation for a harmonic family and "Sdb" is an abbreviation for a sideband family. FIGS. 10B and 11B demonstrate the ability provided by these embodiments for a user to select a type(s) of filtering to be applied to the largest peaks or peak families using dropdowns and checkboxes in a grid. For example, in the table appearing in FIG. 10B, the top three peaks which are shown on FIG. 10A are peaks 1 (29.20 Hz on the graph of FIG. 10A, as listed in the table in FIG. 10B), peak 11 (240.07 Hz), and peak 13 (269.27), respectively. Of these, peak 1 is checked for bandpass filtering, with peaks 3 and 6 (left-most column of the table) selected for bandstop filtering and low pass filtering, respectively. The result would be to filter out (remove) motion occurring at all frequencies higher than 116.80 Hz. Even within the range of 0-116.80 Hz, additional filtering occurs in this example due to the bandpass filter around peak 1 and a bandstop filter around peak 3.

Employing a different filtering strategy, FIG. 11B is an example where a user can select to have all frequencies between selected peaks automatically filtered out. Harmonic family 1 ("Hrm-1") includes the peak at 29.20 Hz, which is Member ID "1" in FIG. 11B. Smaller peaks occur every 29.20 Hz (e.g., 58.40 Hz, 87.60 Hz, etc.) and are within Hrm-1 with the Member ID's 2, 3, 4, 5, 6, 7, 8, 9, 10. These peaks will be included in the data as denoted by the solid line portion in FIG. 11A and FIG. 11B (which as shown on a user interface might be provided in a first color, while other peaks in these figures which are denoted by a dashed line, no dots (and would appear in a different color) will be filtered out, including five peaks of harmonic family 2 (Hrm-2). Accordingly, by selectively applying filtering options based on information from the original video itself, present embodiments accelerate a user's ability to quickly identify an optimum filtering strategy to apply to multiple peaks in a frequency spectrum, provide consistency in the viewing from one day to the next, and allow for change over time to be more readily perceived.

An optional method within the scope of present embodiments is used to further enhance the inventive technique. This involves amplifying motion in a video generated by the system with use of an amplification factor, by which a user manually or the system autonomously selects a reference frame from among a series of image frames representing motion over time. Other frames in the series then are compared to that reference frame to create a new set of differenced images, as described in detail (including without limitation Paragraphs Nos. 0195-0215) in published patent application denoted as US Publication No. 2016/0300341, titled "Apparatus and Method for Visualizing Periodic Motions in Mechanical Components," the full contents of this application being incorporated herein by reference in their entirety. In some embodiments, amplification occurs by increasing in accordance with an amplification factor the displacement of at least one component, as seen from a first video frame to a second video frame.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways. Also, it is to be understood that words and phrases used herein are for the purpose of description and should not be regarded as limiting. The use herein of such words and phrases as "including," "such as," "comprising," "e.g.," "containing," or "having" and variations of those words is meant to encompass the items listed thereafter, and equivalents of those, as well as additional items.

Accordingly, the foregoing descriptions of embodiments and alternatives are meant to illustrate, rather than to serve as limits on the scope of what has been disclosed herein. The descriptions herein are not meant to limit the understanding of the embodiments to the precise forms disclosed. It will be understood by those having ordinary skill in the art that modifications and variations of these embodiments are reasonably possible in light of the above teachings and descriptions.

What is claimed is:

1. A method for monitoring a machine, comprising:
    obtaining a video recording comprising a plurality of video frames of the machine in motion;
    constructing one or more temporally changing filters associated with motion of some object in the video; and
    in response to user input, dynamically applying the one or more filters to isolate, amplify,
    or remove apparent motion in the video recording occurring in a user-selected region of interest, at the at least one selected frequency or the at least one selected frequency range which varies with the operation of the machine, thereby producing one or more new video outputs which create a visual presentation of a subset of the motion of the machine in the video recording.

2. The method of claim 1, further comprising applying a tracking filter to the video recording based on an external signal that measures a frequency of interest.

3. The method of claim 2, wherein the frequency of interest is a turning speed of the machine.

4. The method of claim 1, further comprising measuring a frequency of motion for the machine or a component of the machine in the video from a time waveform and a frequency spectrum obtained from at least one motion measured from an external sensor positioned at a location of the machine.

* * * * *